United States Patent
Frolovichev

(10) Patent No.: US 11,050,688 B2
(45) Date of Patent: Jun. 29, 2021

(54) APPARATUS AND METHOD FOR IMPROVING COMMUNICATION BETWEEN MATCHED INDIVIDUALS

(71) Applicant: AMI Holdings Limited, Hamilton (BM)

(72) Inventor: Sergey Frolovichev, Hamilton (BM)

(73) Assignee: AMI Holdings Limited, Hamilton (BM)

( * ) Notice: Subject to any disclaimer, the term of this patent is extended or adjusted under 35 U.S.C. 154(b) by 7 days.

(21) Appl. No.: 16/175,616

(22) Filed: Oct. 30, 2018

(65) Prior Publication Data

US 2020/0137003 A1    Apr. 30, 2020

(51) Int. Cl.
*H04L 12/58* (2006.01)

(52) U.S. Cl.
CPC .............. *H04L 51/04* (2013.01); *H04L 51/32* (2013.01)

(58) Field of Classification Search
CPC ......... H04L 51/04; H04L 51/32; H04L 29/06; G06F 16/3331; G06F 16/248; G06F 3/0482; G06Q 10/10; G06Q 50/01; B29C 64/386; B33Y 50/00; G06T 17/00; G06K 9/00087

See application file for complete search history.

(56) References Cited

U.S. PATENT DOCUMENTS

| | | | |
|---|---|---|---|
| 5,815,595 A * | 9/1998 | Gugler | G06K 9/2054 382/173 |
| 7,203,674 B2 * | 4/2007 | Cohen | G06Q 10/02 |
| 7,684,651 B2 | 3/2010 | Tang | |
| 7,760,917 B2 | 7/2010 | Vanhoucke | |
| 8,566,327 B2 | 10/2013 | Carrico | |
| 8,595,257 B1 | 11/2013 | Ovide | |
| D755,814 S | 5/2016 | Rad et al. | |
| 9,342,855 B1 | 5/2016 | Raphael | |
| 9,560,156 B1 * | 1/2017 | Rana | H04L 67/306 |
| D779,540 S | 2/2017 | Rad et al. | |
| D781,311 S | 3/2017 | Rad et al. | |
| D781,334 S | 3/2017 | Rad et al. | |
| D791,809 S | 7/2017 | Rad et al. | |

(Continued)

FOREIGN PATENT DOCUMENTS

| | | |
|---|---|---|
| WO | WO 2016/076976 | 5/2016 |
| WO | WO 2017/054081 | 4/2017 |

OTHER PUBLICATIONS

Invitation to Pay Additional Fees in International Appln. No. PCT/IB2019/059318, dated Dec. 11, 2019, 14 pages.

(Continued)

*Primary Examiner* — Dhairya A Patel
(74) *Attorney, Agent, or Firm* — Fish & Richardson P.C.

(57) ABSTRACT

A computer implemented method includes supplying to a user at a client device a prompt to contact a matched individual. A proposed communication from the user to the matched individual is monitored. The proposed communication is compared to a set of effective communication policies to selectively identify an effective communication policy violation. A warning is supplied to the user in response to the effective communication policy violation. A signal is received from the user to send a completed communication to the matched individual. Network routing of the completed communication from the client device to the matched individual is enabled.

19 Claims, 5 Drawing Sheets

(56) References Cited

U.S. PATENT DOCUMENTS

| | | | |
|---|---|---|---|
| 9,715,532 B1* | 7/2017 | Hall | G06F 16/24578 |
| 9,733,811 B2* | 8/2017 | Rad | G06Q 50/01 |
| D798,314 S | 9/2017 | Rad et al. | |
| 9,753,948 B2 | 9/2017 | Farrell | |
| 9,848,082 B1* | 12/2017 | Lillard | H04M 3/5231 |
| 9,959,023 B2 | 5/2018 | Rad et al. | |
| 10,318,109 B2* | 6/2019 | Desjardins | H04L 51/10 |
| 2006/0229896 A1* | 10/2006 | Rosen | G06Q 10/10 |
| | | | 705/321 |
| 2008/0040227 A1* | 2/2008 | Ostermann | G06Q 30/0269 |
| | | | 705/14.67 |
| 2008/0086431 A1* | 4/2008 | Robinson | A63F 13/12 |
| | | | 706/11 |
| 2010/0088111 A1* | 4/2010 | Bailey | G06Q 10/10 |
| | | | 705/2 |
| 2012/0066118 A1 | 3/2012 | Dantas | |
| 2012/0136689 A1 | 5/2012 | Ickman | |
| 2012/0271380 A1 | 10/2012 | Roberts | |
| 2012/0290977 A1 | 11/2012 | Devecka | |
| 2012/0296895 A1* | 11/2012 | Robinson | G06F 16/313 |
| | | | 707/723 |
| 2013/0102299 A1 | 4/2013 | Liu | |
| 2013/0165234 A1 | 6/2013 | Hll | |
| 2013/0179925 A1 | 7/2013 | Woods | |
| 2013/0282745 A1 | 10/2013 | Mishra | |
| 2013/0282841 A1* | 10/2013 | Bates | H04L 51/12 |
| | | | 709/206 |
| 2013/0318162 A1 | 11/2013 | Wright | |
| 2013/0346564 A1 | 12/2013 | Warrick | |
| 2014/0019173 A1 | 1/2014 | Spindler | |
| 2014/0032434 A1 | 1/2014 | Kumar | |
| 2014/0074824 A1* | 3/2014 | Rad | G06Q 50/01 |
| | | | 707/722 |
| 2014/0195549 A1 | 7/2014 | Ahn | |
| 2014/0258260 A1 | 9/2014 | Rayborn | |
| 2014/0303981 A1* | 10/2014 | Skiba | H04L 51/046 |
| | | | 704/270 |
| 2014/0328536 A1 | 11/2014 | Whitehill | |
| 2014/0344031 A1 | 11/2014 | Clinton et al. | |
| 2014/0357247 A1 | 12/2014 | Assuncao | |
| 2015/0046357 A1* | 2/2015 | Danson | G06Q 10/1053 |
| | | | 705/321 |
| 2015/0058059 A1 | 2/2015 | Kahan | |
| 2015/0089660 A1* | 3/2015 | Song | G06Q 30/0267 |
| | | | 726/26 |
| 2015/0161632 A1 | 6/2015 | Humay | |
| 2015/0172243 A1* | 6/2015 | Parikh | H04L 51/12 |
| | | | 709/206 |
| 2015/0207765 A1* | 7/2015 | Brantingham | H04L 51/046 |
| | | | 715/758 |
| 2015/0254618 A1 | 9/2015 | Shivaram | |
| 2015/0310507 A1 | 10/2015 | Woodward | |
| 2016/0105388 A1 | 4/2016 | Bin Mahfooz et al. | |
| 2016/0132608 A1 | 5/2016 | Rathod | |
| 2016/0154569 A1 | 6/2016 | Rad et al. | |
| 2016/0316503 A1 | 10/2016 | Lo | |
| 2016/0344777 A1 | 11/2016 | Fahlgren | |
| 2017/0337521 A1 | 11/2017 | Godbole | |
| 2017/0358033 A1 | 12/2017 | Montoya | |
| 2018/0029298 A1 | 2/2018 | Takaya et al. | |
| 2018/0150205 A1 | 5/2018 | Rad et al. | |
| 2018/0285986 A1 | 10/2018 | Perry | |
| 2019/0050920 A1 | 2/2019 | Kumar | |
| 2019/0080012 A1* | 3/2019 | Huang | G06K 9/00268 |
| 2019/0158305 A1 | 5/2019 | Cui | |
| 2019/0164108 A1 | 5/2019 | Chimka | |
| 2020/0134288 A1* | 4/2020 | Frolovichev | G06K 9/00288 |
| 2020/0134739 A1 | 4/2020 | Frolovichev | |
| 2020/0137007 A1 | 4/2020 | Frolovichev | |
| 2021/0103715 A1 | 4/2021 | Frolovichev | |

OTHER PUBLICATIONS

International Search Report for International Appln. No. PCT/IB2019/059318, dated Feb. 4, 2020.

* cited by examiner

APPARATUS AND METHOD FOR IMPROVING COMMUNICATION BETWEEN MATCHED INDIVIDUALS

FIELD OF THE INVENTION

This invention relates generally to social media dating applications deployed in computer networks. More particularly, this invention is directed toward techniques for improving communication between matched individuals.

BACKGROUND OF THE INVENTION

Social media dating applications propose matches between individuals. An individual may have a negative social media dating application experience when a communication by the individual to a matched individual does not result in a reply from the matched individual. Thus, there is an ongoing need to improve social medial dating application experience through improved communications that are statistically more likely to solicit a reply from the matched individual.

SUMMARY OF THE INVENTION

A computer implemented method includes supplying to a user at a client device a prompt to contact a matched individual. A proposed communication from the user to the matched individual is monitored. The proposed communication is compared to a set of effective communication policies to selectively identify an effective communication policy violation. A warning is supplied to the user in response to the effective communication policy violation. A signal is received from the user to send a completed communication to the matched individual. Network routing of the completed communication from the client device to the matched individual is enabled.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
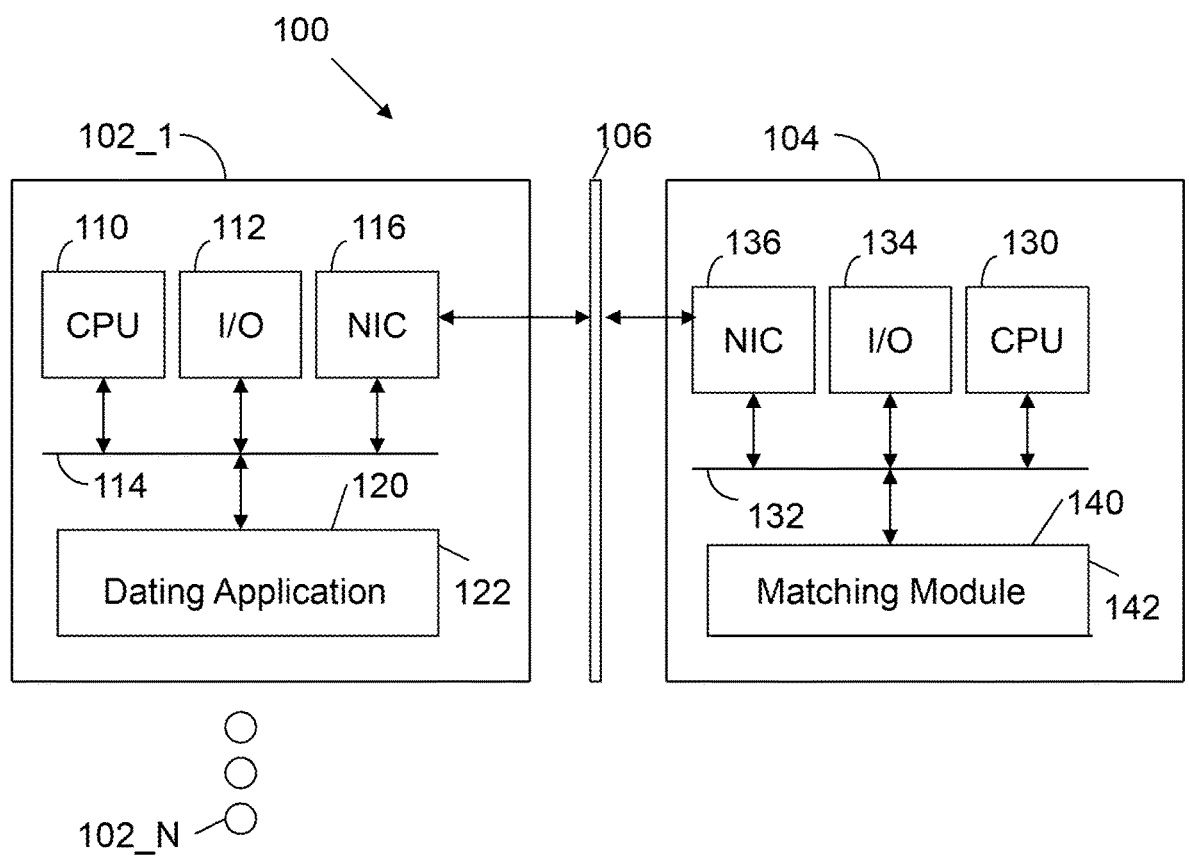
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. Each client device 102 includes a processor (e.g., central processing unit) 110 in communication with input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by the processor 110. In particular, the memory 120 stores a dating application 122, which communicates with server 104 to coordinate introductions between individuals that have been identified as potential matches. Typically, each client device 102_1 through 102N is a mobile device executing the dating application 122. Different client devices 102_1 through 102N are operated by different individuals that subscribe to the same dating application 122.

Server 104 includes standard components, such as a processor 130, bus 132, input/output devices 134 and a network interface circuit 136 to provide connectivity to network 106. A memory 140 is connected to the bus 132. The memory 140 stores a matching module 142 with instructions executed by the processor 130 to implement operations disclosed in connection with FIG. 2.

Figure 2:
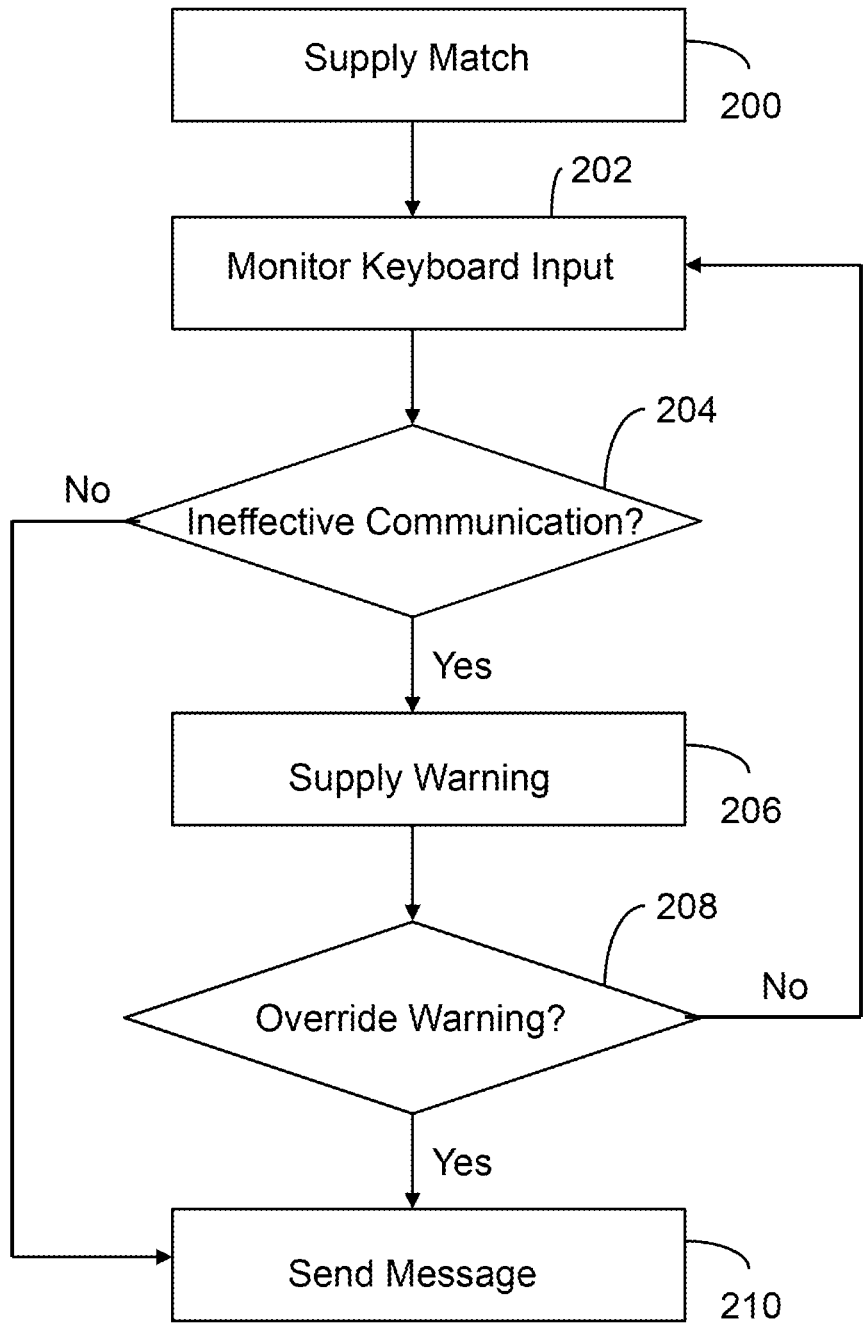
FIG. 2 illustrates processing operations performed in accordance with an embodiment of the invention.

Turning to FIG. 2, the matching module 142 initially supplies a match to a user. More particularly, the matching module 142 sends to client 102_1 a prompt to contact a matched individual. The matching module 142 may use any number of criteria to determine that a matched individual is an appropriate potential romantic partner for the individual.

Figure 3:
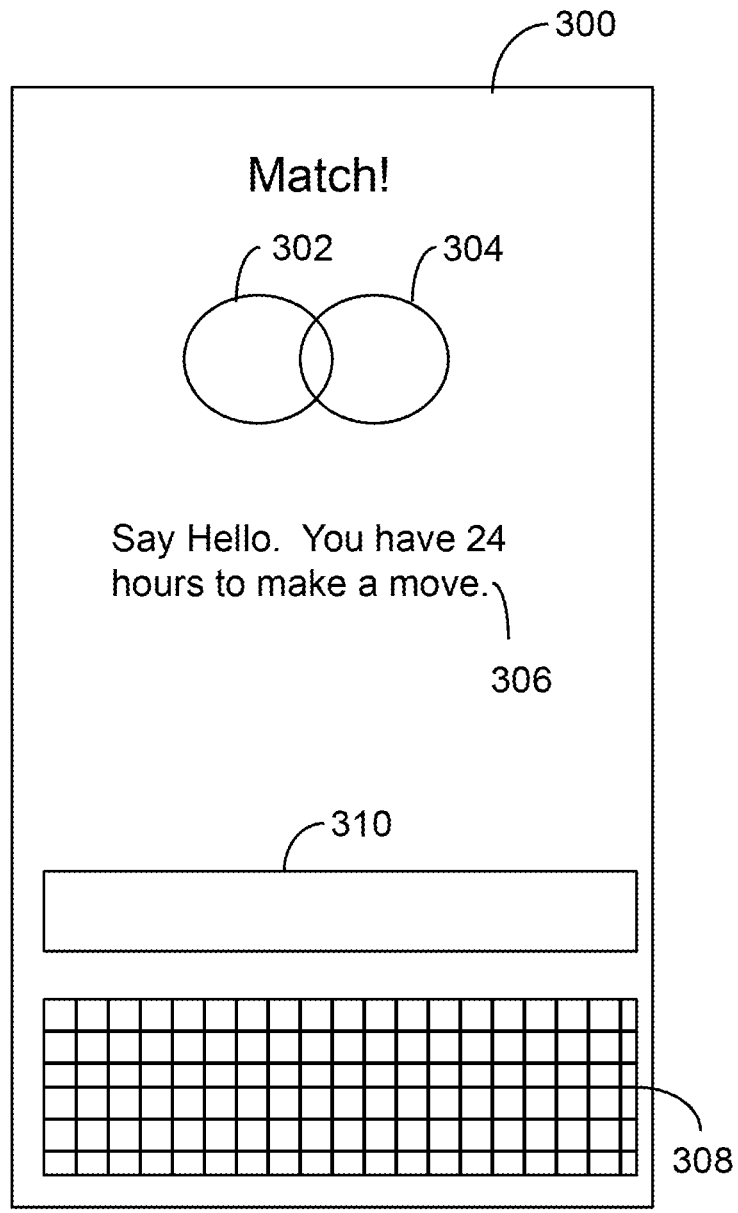
FIGS. 3-5 illustrate user interfaces configured in accordance with embodiments of the invention.

FIG. 3 illustrates a user interface 300 that may be used to supply a match. In this example, the user interface 300 states that there is a match and then provides a user icon 302 and a matched individual icon 304. For example, the user icon 302 and matched individual icon 304 may include a photo, a name and selected profile information. Activation of the matched individual icon may lead to complete profile information for the matched individual. The user interface 300 may also include contact information 306, in this case specifying an ephemeral time period in which to contact the matched individual. The user interface 300 also includes a keyboard 308. Input to the keyboard is shown in text entry box 310.

Returning to FIG. 2, the keyboard input is monitored 202. More particularly, a proposed communication from the user to the matched individual is monitored by comparing the proposed communication to a set of effective communication policies to selectively identify an effective communication policy violation. In the case of an ineffective communication (204—Yes), a warning is supplied 206.

Figure 4:
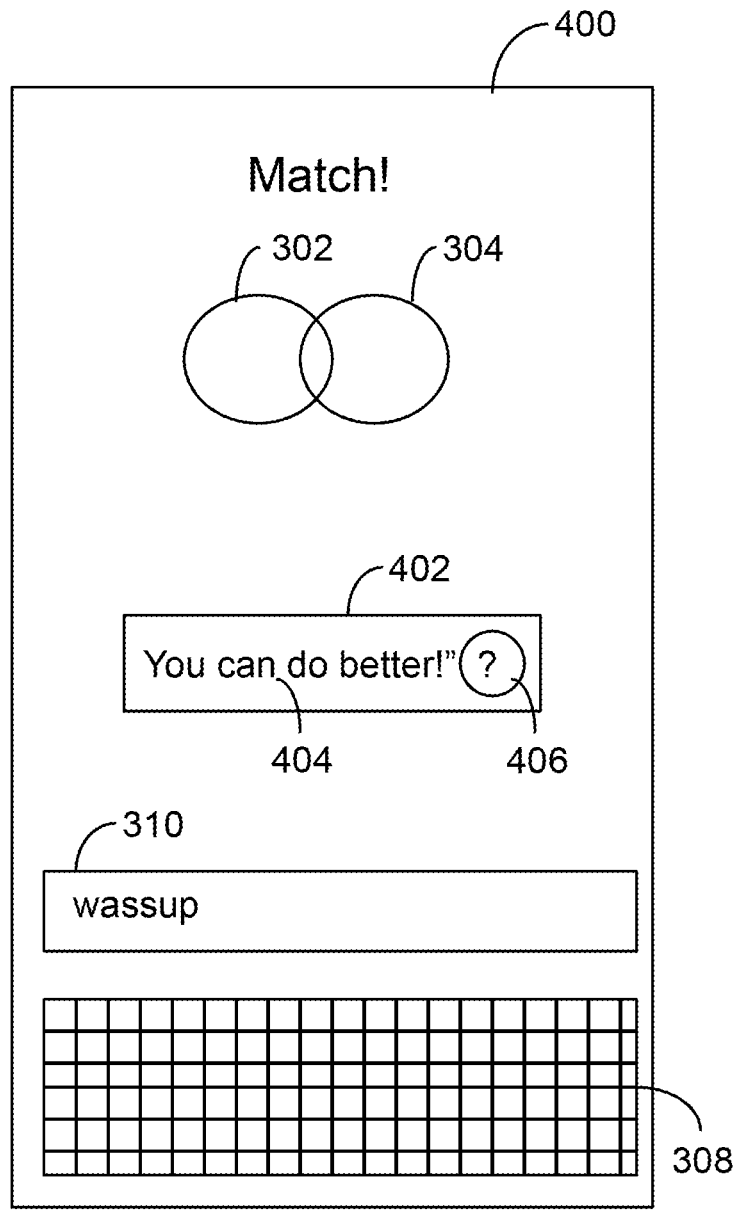
Figure 5:
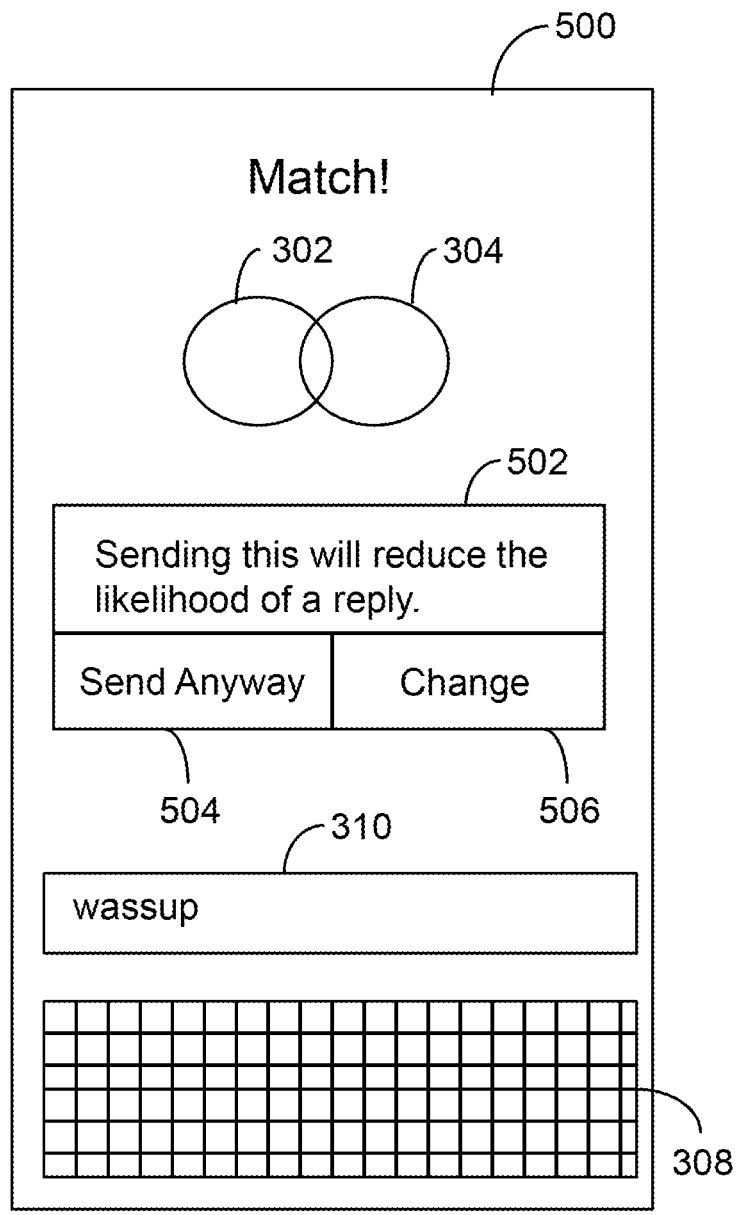

FIG. 4 illustrates a user interface 400 where a user has entered into the text box 310 an ineffective communication. The interface 400 supplies a warning 402, which may have a textual component 404 and an information tab 406. Activation of the information tab 406 may result in user interface 500 of FIG. 5, with a text box 502 that indicates that sending the communication will reduce the likelihood of a reply. A send tab 504 and a change tab 506 are supplied to respectively send or reformulate the message.

Returning to FIG. 2, the warning can be overridden (208—Yes) by activating send tab 504, in which case the message is sent 210. If the change tab 506 is activated, control returns to block 202. If the user formulates an effective communication (204—No) and presses a send button, the message is sent 210.

Sending a message may involve the matching module 142 coordinating network routing of a completed communication (e.g., a text message) from a first client device (e.g., 102_1) to a second client device (e.g., 102_N).

The effective communication policies may be in various forms. An effective communication policy may be based upon common sense communication etiquette. An effective communication policy may be based upon statistical analysis of prior communications in a dating application and the segmenting of those prior communications into statistically definitive effective and ineffective communications.

One effective communication policy is in the form of a list of ineffective words. Example ineffective words include hey, hay, hi, hi there, hey there, hello, hullo, howdy, yo oy, oi, lo what's up, whats up, wassup, wuddup, sup, how are you, so and ello. Another effective communication policy is a list of ineffective emoticons, such as negative sentiment emoticons. Another effective communication policy is a list of ineffective phrases, such as "1 am the real deal", "1 am so hungover", and "You are super hot".

The matching module 142 may also supply communication suggestions likely to produce a communication that satisfies the set of effective communication policies. For example, the suggestion may say one or more of, "If you like this match, ask a more open-ended question", "Comment on the profile of the match", "A more personal statement increases odds of a reply" or "Reference a fact from the bio of the match".

The disclosed techniques improve the quality of messages in a social network, particularly a dating application. Improved communications facilitate more social interactions and therefore a better user experience.

The disclosed techniques are most successfully employed during an initial match stage, but may also be used to monitor and improve all communications.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
supplying to a client device data for display in a graphical user interface, the data including a prompt to a user of the client device to send an electronic communication to a matched individual;
monitoring electronic communications originating at the client device to identify a first electronic communication from the user to the matched individual;
comparing the first electronic communication to a set of effective communication policies to selectively identify an effective communication policy violation, wherein the set of effective communication policies is based upon statistical analysis of prior communications in a dating application and a segmenting of the prior communications into statistically effective communications and statistically ineffective communications;
in response to the effective communication policy violation, preventing transmission of the first electronic communication and supplying to the client device data for display in the graphical user interface, the data including a first prompt to the user of the client device to alter the first electronic communication and a second prompt to the user of the client device to override the effective communication policy violation;
when data is received indicative of a selection by the user of the client device to alter the first electronic communication;
monitoring electronic communications originating at the client device to identify a second electronic communication from the user to the matched individual;
determining that the second electronic communication comprises an effective communication by comparing the second electronic communication to the set of effective communication policies;
receiving data indicative of a selection by the user of the client device to send the second electronic communication to the matched individual; and
enabling network routing of the second electronic communication from the client device to the matched individual; and
when data is received indicative of a selection by the user of the client device to override the effective communication policy violation, enabling network routing of the first electronic communication from the client device to the matched individual.

2. The computer implemented method of claim 1 further comprising supplying communication suggestions likely to produce an electronic communication that satisfies the set of effective communication policies.

3. The computer implemented method of claim 1 wherein the set of effective communication policies include a list of ineffective words.

4. The computer implemented method of claim 1 wherein the set of effective communication policies include a list of ineffective emoticons.

5. The computer implemented method of claim 1 wherein the set of effective communication policies include a list of ineffective phrases.

6. The computer implemented method of claim 1 comprising modifying one or more effective communication policies in the set of effective communication policies based on the second electronic communication and the determination that the second electronic communication comprises an effective communication.

7. The computer implemented method of claim 1 comprising supplying, to the client device, a warning to the user of the client device in response to the effective communication violation.

8. The computer implemented method of claim 7 wherein the warning comprises an indication that the first communication is unlikely to elicit a response from the matched individual.

9. The computer implemented method of claim 1 further comprising:
performing statistical analysis of the prior communications to determine whether each of the prior communications is a statistically effective communication or a statistically ineffective communication; and
determining the set of effective communication policies by the segmenting the prior communications into the statistically effective communications and the statistically ineffective communications.

10. The computer implemented method of claim 1 wherein the set of effective communication policies include policies for identifying a likelihood of a reply to an electronic communication, and wherein the effective communication policy violation comprises a communication that is unlikely to solicit a reply.

11. A system, comprising:
one or more processors; and
a computer-readable storage medium storing instructions which, when executed by the one or more processors, cause the one or more processors to perform operations comprising:
supplying to a client device data for display in a graphical user interface, the data including a prompt to a user of the client device to send an electronic communication to a matched individual;
monitoring electronic communications originating at the client device to identify a first electronic communication from the user to the matched individual;
comparing the first electronic communication to a set of effective communication policies to selectively identify an effective communication policy violation, wherein the set of effective communication policies is based upon statistical analysis of prior communications in a dating application and a segmenting of the prior communications into statistically effective communications and statistically ineffective communications;
in response to the effective communication policy violation, preventing transmission of the first electronic communication and supplying to the client device data for display in the graphical user interface, the data including a first prompt to the user of the client device to alter the first electronic communication and a second prompt to the user of the client device to override the effective communication policy violation;
when data is received indicative of a selection by the user of the client device to alter the first electronic communication;
monitoring electronic communications originating at the client device to identify a second electronic communication from the user to the matched individual;
determining that the second electronic communication comprises an effective communication by comparing the second electronic communication to the set of effective communication policies;
receiving data indicative of a selection by the user of the client device to send the second electronic communication to the matched individual; and
enabling network routing of the second electronic communication from the client device to the matched individual; and
when data is received indicative of a selection by the user of the client device to override the effective communication policy violation, enabling network routing of the first electronic communication from the client device to the matched individual.

12. The system of claim 11, further comprising supplying, by the one or more processors, communication suggestions likely to produce an electronic communication that satisfies the set of effective communication policies.

13. The system of claim 11, wherein the set of effective communication policies include a list of ineffective words, ineffective emoticons, or ineffective phrases.

14. The system of claim 11, further comprising modifying, by the one or more processors, one or more effective communication policies in the set of effective communication policies based on the second electronic communication and the determination that the second electronic communication comprises an effective communication.

15. The system of claim 11, wherein the set of effective communication policies include policies for identifying a likelihood of a reply to an electronic communication, and wherein the effective communication policy violation comprises a communication that is unlikely to solicit a reply.

16. A non-transitory computer-readable storage medium storing instructions which, when executed by one or more processors, cause the one or more processors to perform operations comprising:
supplying to a client device data for display in a graphical user interface, the data including a prompt to a user of the client device to send an electronic communication to a matched individual;
monitoring electronic communications originating at the client device to identify a first electronic communication from the user to the matched individual;
comparing the first electronic communication to a set of effective communication policies to selectively identify an effective communication policy violation, wherein the set of effective communication policies is based upon statistical analysis of prior communications in a dating application and a segmenting of the prior communications into statistically effective communications and statistically ineffective communications;
in response to the effective communication policy violation, preventing transmission of the first electronic communication and supplying to the client device data for display in the graphical user interface, the data including a first prompt to the user of the client device to alter the first electronic communication and a second prompt to the user of the client device to override the effective communication policy violation;
when data is received indicative of a selection by the user of the client device to alter the first electronic communication;
monitoring electronic communications originating at the client device to identify a second electronic communication from the user to the matched individual;
determining that the second electronic communication comprises an effective communication by comparing the second electronic communication to the set of effective communication policies;

receiving data indicative of a selection by the user of the client device to send the second electronic communication to the matched individual; and enabling network routing of the second electronic communication from the client device to the matched individual; and when data is received indicative of a selection by the user of the client device to override the effective communication policy violation, enabling network routing of the first electronic communication from the client device to the matched individual.

17. The non-transitory computer-readable medium of claim 16, further comprising supplying, by the one or more processors, communication suggestions likely to produce an electronic communication that satisfies the set of effective communication policies.

18. The non-transitory computer-readable medium of claim 16, wherein the set of effective communication policies include a list of ineffective words, ineffective emoticons, or ineffective phrases.

19. The non-transitory computer-readable medium of claim 16, wherein the set of effective communication policies include policies for identifying a likelihood of a reply to an electronic communication, and wherein the effective communication policy violation comprises a communication that is unlikely to solicit a reply.

* * * * *